C. H. PEARDON.
HOPPLE.
APPLICATION FILED MAR. 19, 1920.

1,373,349.

Patented Mar. 29, 1921.

C. H. Peardon
INVENTOR

BY Victor J. Evans
ATTORNEY

WITNESS:

UNITED STATES PATENT OFFICE.

CHARLES H. PEARDON, OF MUKWONAGO, WISCONSIN.

HOPPLE.

1,373,349.  Specification of Letters Patent.  Patented Mar. 29, 1921.

Application filed March 19, 1920. Serial No. 367,273.

*To all whom it may concern:*

Be it known that I, CHARLES H. PEARDON, a citizen of the United States, residing at Mukwonago, in the county of Waukesha and State of Wisconsin, have invented new and useful Improvements in Hopples, of which the following is a specification.

This invention relates to hopples, and comprehends the provision of a device which can be readily and easily associated with the legs of the animal to prevent the latter from kicking, the device being susceptible of adjustment to maintain the legs of the animal spaced the desired distance.

More specifically stated, the invention embodies a flexible element provided with balls or knots at spaced intervals, and equipped with hook-like elements which are adapted to engage with the rear legs of the animal. A latch element is associated with one of the hook members and is designed to coöperate with the said knots or balls to hold the said hook members in any desired position in the length of the flexible element.

The nature and advantages of the invention will be better understood when the following detail description is taken in connection with the accompanying drawings, the invention residing in the construction, combination and arrangement of parts as claimed.

In the drawings forming part of this application, like numerals of reference indicate similar parts in the several views and wherein:—

Figure 1:
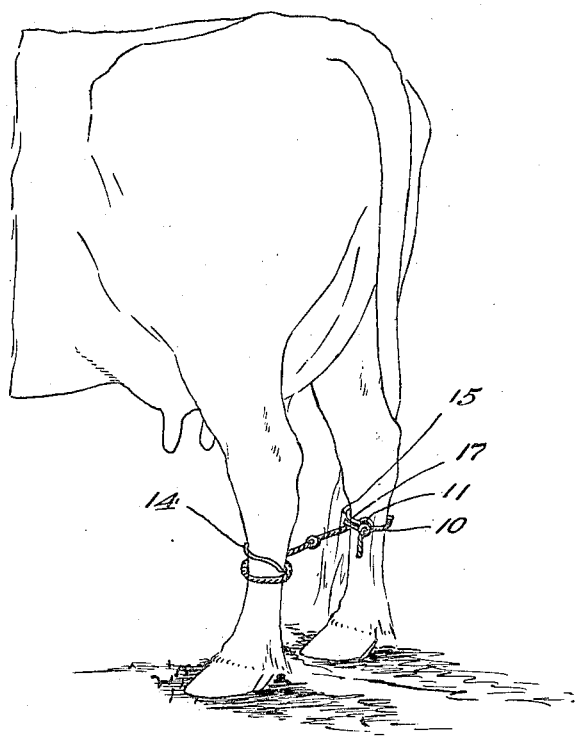
Figure 1 is a view showing the manner of associating the device with the hind legs of an animal.
Figure 2:
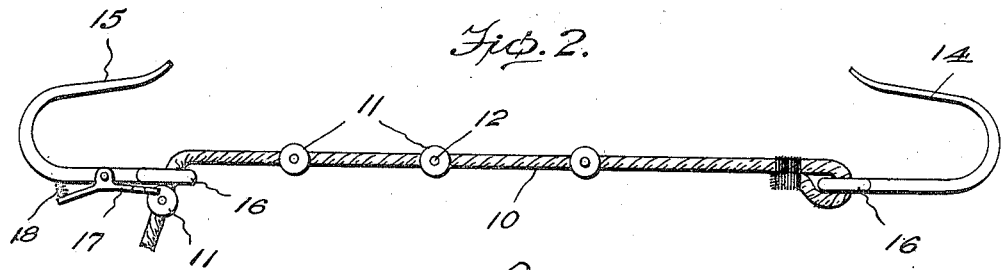
Fig. 2 is a view of the device removed from the animal.
Figure 3:
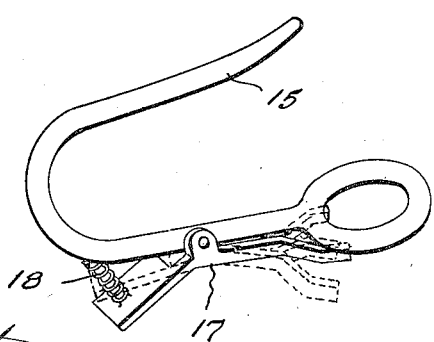
Fig. 3 is an enlarged detail view of the latch element showing its active position by full lines and its inactive position by dotted lines.

Referring to the drawings in detail, the device forming the subject matter of my invention embodies a flexible element indicated at 10. It may be rope or any other suitable material and provided with enlargements 11 at spaced intervals throughout the major portion of its length. These enlargements may be provided by knotting the flexible element 10, or they may be in the nature of iron balls or the like having openings to receive the element 10 and secured thereto by means of rivets 12 or other suitable fastening elements. Hook like members 14 and 15 are associated with the flexible elements, and designed to engage with the rear legs of the animal, the device in its entirety being utilized to prevent the animal from kicking. The invention is primarily designed to be used in connection with cows while being milked, although its general application is contemplated by the claims. The hook like members 14 and 15 are identical in construction, each including a loop or eye 16. The loop or eye 16 of the member 14 is permanently secured to one end of the flexible element while the eye or loop 16 of the member 15 receives the opposite end of the flexible element, this member being arranged for adjustment longitudinally of the element 10 for the purpose to be hereinafter described. The eye or loop 16 of the said member 15, is slightly larger than the notch or ball 11, so that the latter may pass freely through said loop or eye when the hook like member 15 is being adjusted longitudinally of the element 10. By reason of this adjustment, the hooks 14 and 15 can be brought toward and away from each other to hold the legs of the animal spaced apart the desired distance.

With a view of automatically locking the hook-like member 15, in any of its adjusted positions upon the flexible element 10, I make use of a latch element 17 which is pivotally mounted upon the shank of the hook like member 15. The latch element 17 is arranged in parallelism with the shank of the said hook member, and mounted for movement toward and away therefrom. A spring 18 is secured to the shank and to one end of the latch 17, this spring functioning to normally maintain the latch 17 in an active position. The opposite end of the latch 17 is bifurcated and terminates immediately adjacent the eye or loop 16 of the said member with which it is associated. The parts are so arranged that when the flexible element 10 is drawn through the loop or eye 16 of the member 15, the enlargement 11 contacts the adjacent extremity of the latch element moving it away from the shank of the member 15, so that it will not retard or otherwise interfere with the drawing of the flexible element through the said eye or loop 16. Subsequent to the adjustment of the hook member 15 upon the flexible element 10, the spring 18 returns the latch element to its normal or active position, so that the bifurcated extremity lies between the loop or eye 16, and the adjacent enlargement 11 as shown. In this position, the latch element 17 prevents the member 15 from moving longitudinally on the flexible element in the direction of the free end thereof. In practice, the hook like members 14 and 15 respectively are positioned upon the legs of the animal in the manner illustrated in Fig. 1, the free end of the flexible element being then drawn to the eye or loop of the member 15. Manifestly it results in the drawing together of the legs of the animal and when in proper position the free end of the flexible element is released, the latch element 17 automatically operating to hold the hook member 15 in its adjusted position as above described.

While it is believed that from the foregoing description, the nature and advantages of the invention will be readily apparent, I desire to have it understood that I do not limit myself in this connection and that such changes may be resorted to when desired as fall within the scope of what is claimed.

Having thus described my invention what I claim as new is:—

1. A device of the character described, including a flexible element, an enlargement carried by said element at spaced intervals, a hook-like member designed to receive said element, whereby the hook-like member is slidably mounted upon the element, yieldable means carried by said member and coöperating with said enlargement whereby said hook-like member automatically engages said element in its different adjusted positions to prevent movement of the member upon the element in one direction.

2. A device of the character described including a flexible element, an enlargement carried by said element at spaced intervals, a hook-like member, an eye carried by said member to receive said element whereby said member is slidably mounted upon the element, a latch carried by the said member and designed to coöperate with said enlargement to hold the hook-like member in any of its adjusted positions upon the element, and resilient means for holding said latch normally in its active positions.

3. A device of the character described including a flexible element, an enlargement carried by said element at spaced intervals, a hook-like member slidably mounted upon the element, a latch pivoted upon the shank of said hook-member and having its upper end bifurcated to coöperate with said enlargements for holding the hook member in any of its adjusted positions upon the element, and resilient means for normally holding the latch in an active position and rendering the latter automatic in its operation.

In testimony whereof I affix my signature.

CHARLES H. PEARDON.